United States Patent [19]

Waller

[11] Patent Number: 5,024,687

[45] Date of Patent: Jun. 18, 1991

[54] DRY AIR PURGE SYSTEM FOR VAPOR CANISTER

[75] Inventor: Roger A. Waller, Sterling Hts, Mich.

[73] Assignee: Chrysler Corporation, Highland Park, Mich.

[21] Appl. No.: 530,953

[22] Filed: May 29, 1990

[51] Int. Cl.$^5$ ............................................. B01D 45/00
[52] U.S. Cl. ........................................ 55/316; 55/387; 55/421; 123/519
[58] Field of Search ................. 55/316, 387, 392, 394, 55/421, 462, 482; 123/516, 519; 141/52, 59; 220/85 VR, 85 VS

[56] References Cited

U.S. PATENT DOCUMENTS

| | | | |
|---|---|---|---|
| 4,232,715 | 11/1980 | Pyle | 141/1 |
| 4,630,749 | 12/1986 | Armstrong et al. | 220/86.2 |
| 4,651,889 | 3/1987 | Uranishi et al. | 55/387 |
| 4,706,708 | 11/1987 | Fornuto et al. | 141/59 |
| 4,715,509 | 12/1987 | Ito et al. | 141/59 |
| 4,724,861 | 2/1988 | Covert et al. | 141/59 |
| 4,727,955 | 3/1988 | Honda et al. | 55/387 |
| 4,742,809 | 5/1988 | Ito et al. | 123/519 |
| 4,770,677 | 9/1988 | Harris | 55/168 |
| 4,944,779 | 7/1990 | Szlaga et al. | 55/387 |
| 4,966,299 | 10/1990 | Teets et al. | 137/587 |

Primary Examiner—Jay H. Woo
Assistant Examiner—C. Scott Bushey
Attorney, Agent, or Firm—Kenneth H. MacLean, Jr.

[57] ABSTRACT

In a vehicle with an internal combustion engine and a fuel tank and having a fuel vapor recovery system to collect fuel vapors from the fuel tank as the tank is filled with liquid fuel which includes a canister to collect vapors, an air inletting apparatus is provided to supply a flow of dry purge air to the canister during a purge of vapors therefrom. The apparatus includes a water separator device with an automatic water drain to first separate water from air, second collect the water and third drain the water from the separator.

6 Claims, 4 Drawing Sheets

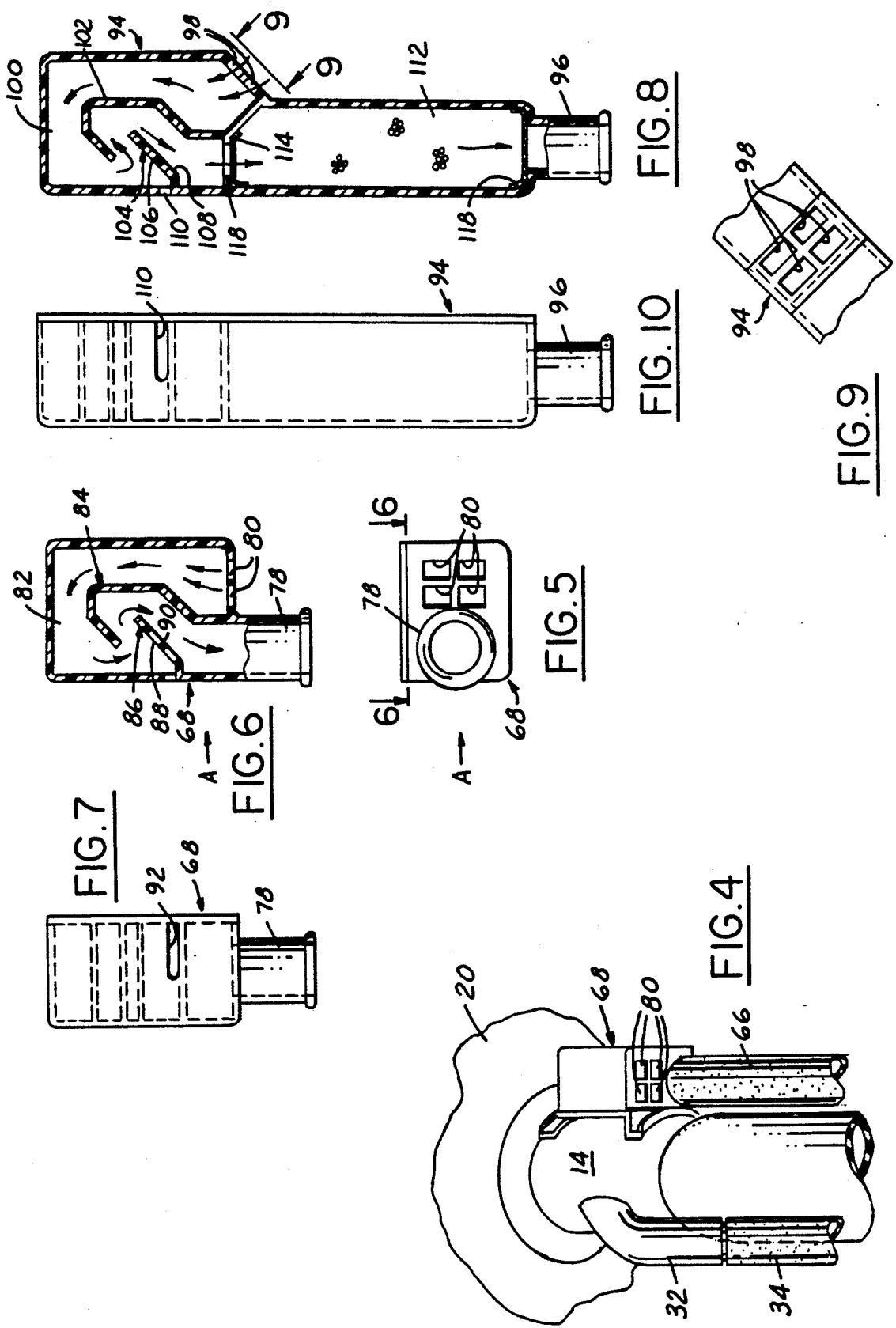

DRY AIR PURGE SYSTEM FOR VAPOR CANISTER

BACKGROUND OF THE INVENTION

1. Field of the Invention

This application concerns a vehicle fuel filling system of the type using a fuel vapor retaining canister to store fuel vapors displaced from a fuel tank as the tank is refilled with liquid fuel and more specifically a dry air purge system for the canister.

2. Description of Related Art

Apparatus and systems for vehicles to prevent the discharge of fuel vapors to atmosphere are known. Apparatus of this type normally uses a fuel vapor storage canister filled with activated charcoal or the like to temporarily store fuel vapors. The escape of fuel vapors which are displaced from the fuel tank during a filling operation should be avoided. After being collected in the charcoal canister, these vapors must then be purged from the activated charcoal while the vehicle engine is running. This is accomplished by drawing air through the canister and into the engine's intake manifold.

An earlier filled patent application by co-workers of the present inventor concerns a filler device for a tank to prevent escape of fuel vapors to atmosphere. This application is Ser. No. 07/378,567 by M. Teets et al. entitled "Fuel Filler Assembly," filed July 11, 1989, now U.S. Pat. No. 4,966,299. It does not disclose air inletting for a purge system for a canister.

U.S. Pat. No. 4,770,677 to Harris discloses a filler device for a fuel tank to prevent escape of vapor and also shows a canister purge system. Harris does not disclose a dry air inletting system for purging a canister as in the subject application.

SUMMARY OF THE INVENTION

This application applies a unique dry air inletted purge system including a fuel vapor storage canister to a vehicle fuel tank filling apparatus to prevent escape of fuel vapors to atmosphere and the ingestion of water into the canister.

The system and apparatus includes an air inletting apparatus for purging a vapor storage canister with clean, dry air. The apparatus includes water separation means to prevent ingestion into the canister.

Therefore, an object of this invention is to provide an improved air inletting or induction for a vapor storage canister including means to prevent water ingestion to the canister.

Further objects and advantages of the subject improved air purge apparatus system for a vapor storage canister will become more readily apparent after a reading of the following detailed description of preferred embodiments, reference being had to the drawings which illustrate the embodiments.

IN THE DRAWING

FIG. 1 is a partially sectioned elevational view of a vehicle fuel fill device and vapor recovery system and the subject associated dry air purge for the vapor storing canister; and FIG. 2 is a planar view of the fuel fill device, the canister and the dry air purge system; and FIG. 3 is a partially sectioned elevational view of the canister and purge system; and FIG. 4 is a perspective view of the fuel fill device and the dry air inletting for the purge system; and FIG. 5 is an end view of the dry air inletting device shown in FIGS. 1, 2 and 4; and FIG. 6 is a partially sectioned view of the inlet device taken along section line 6—6 in FIG. 5 looking in the direction of the arrows; and FIG. 7 is a underside or bottom view of the air inletting device looking in the direction of the arrow A in FIG. 5; and FIG. 8 is partially sectioned view similar to FIG. 6 of a modification of the air inletting device; and FIG. 9 is a fragmentary view of the air inletting device shown in FIG. 8 and looking in the direction of the arrow B; and FIG. 10 is an underside or bottom view like FIG. 7 but of the modification.

DETAILED DESCRIPTION OF A PREFERRED EMBODIMENT

Figure 1:
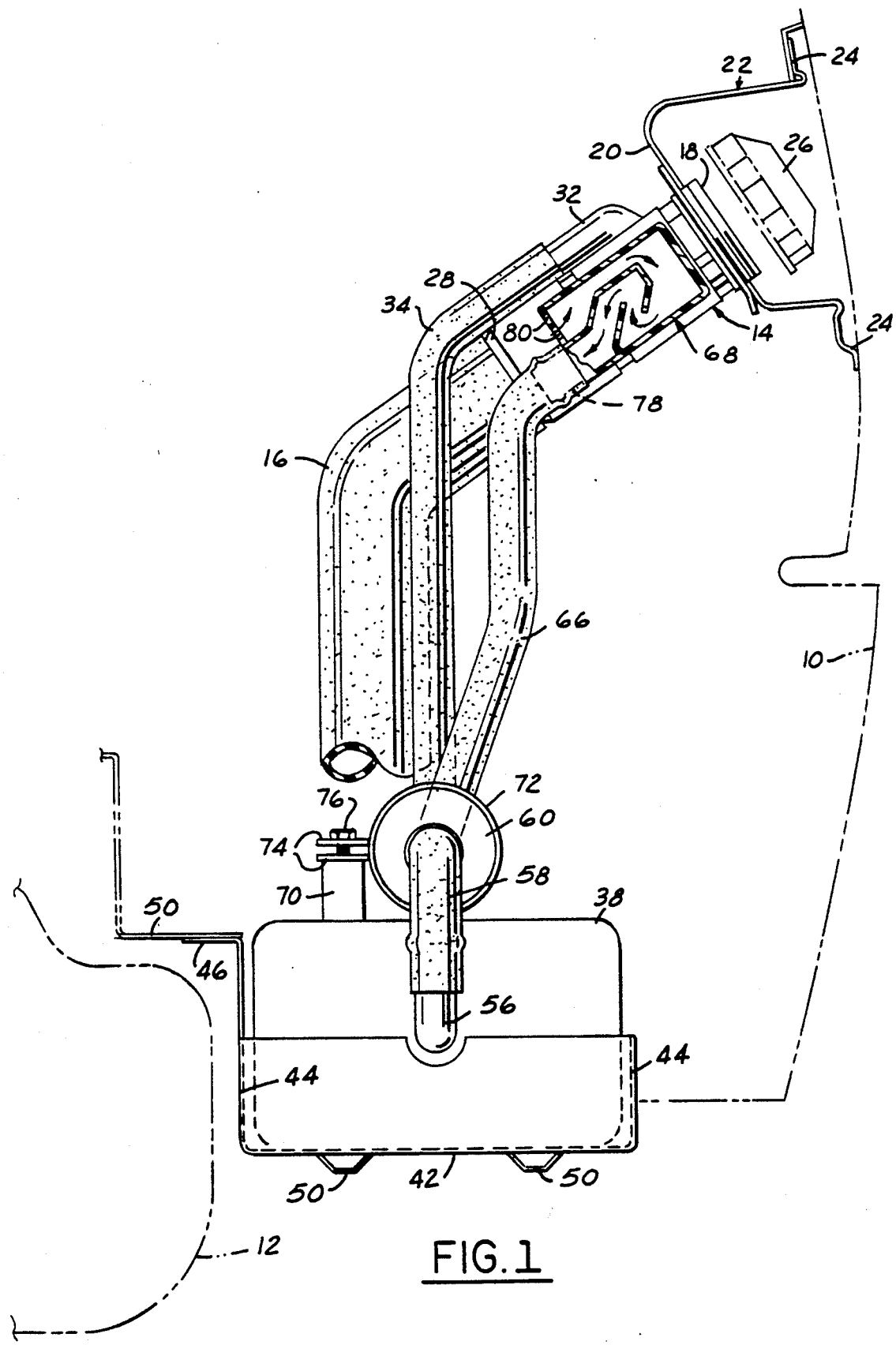
Figure 2:
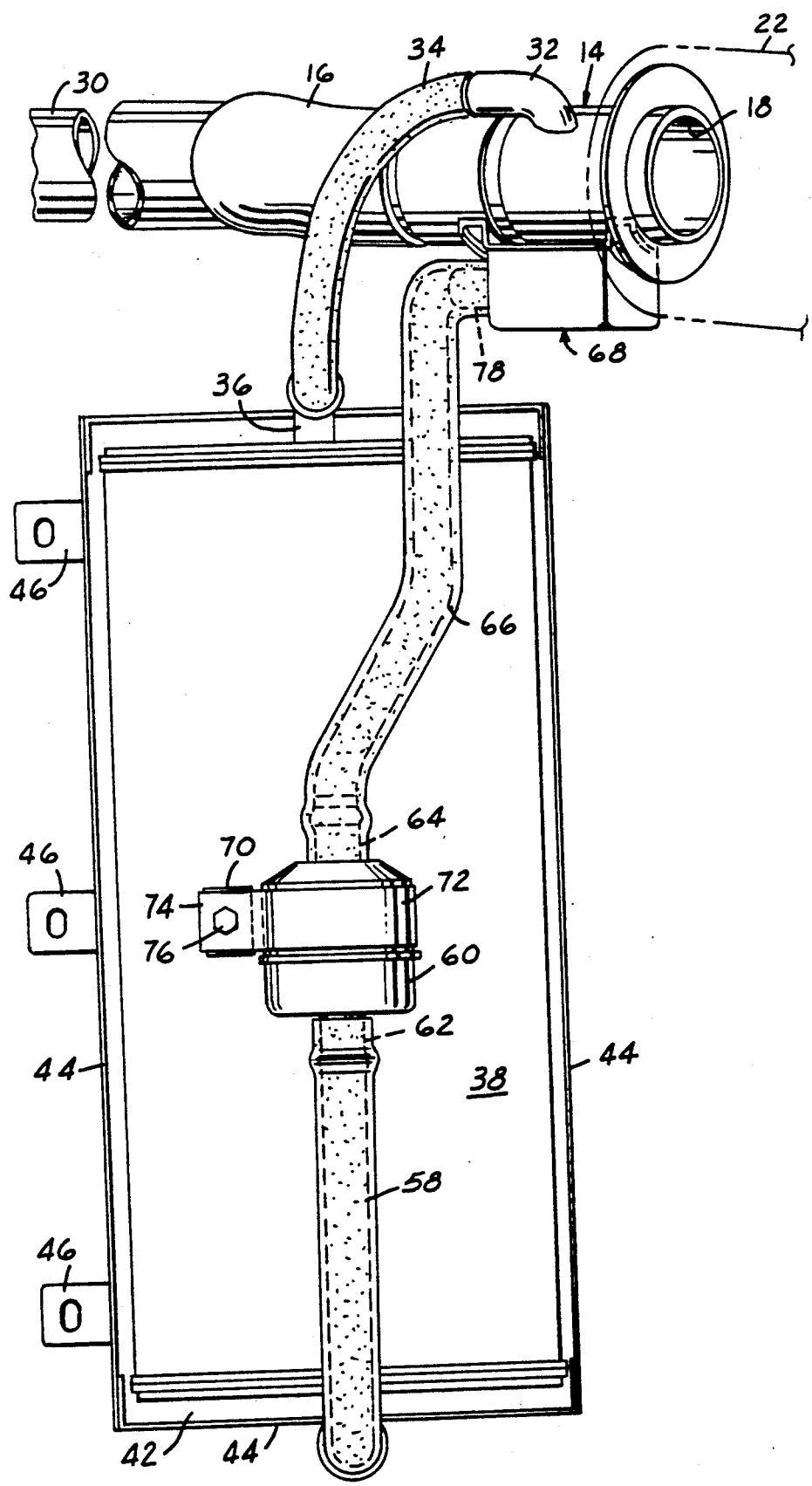
Figure 3:
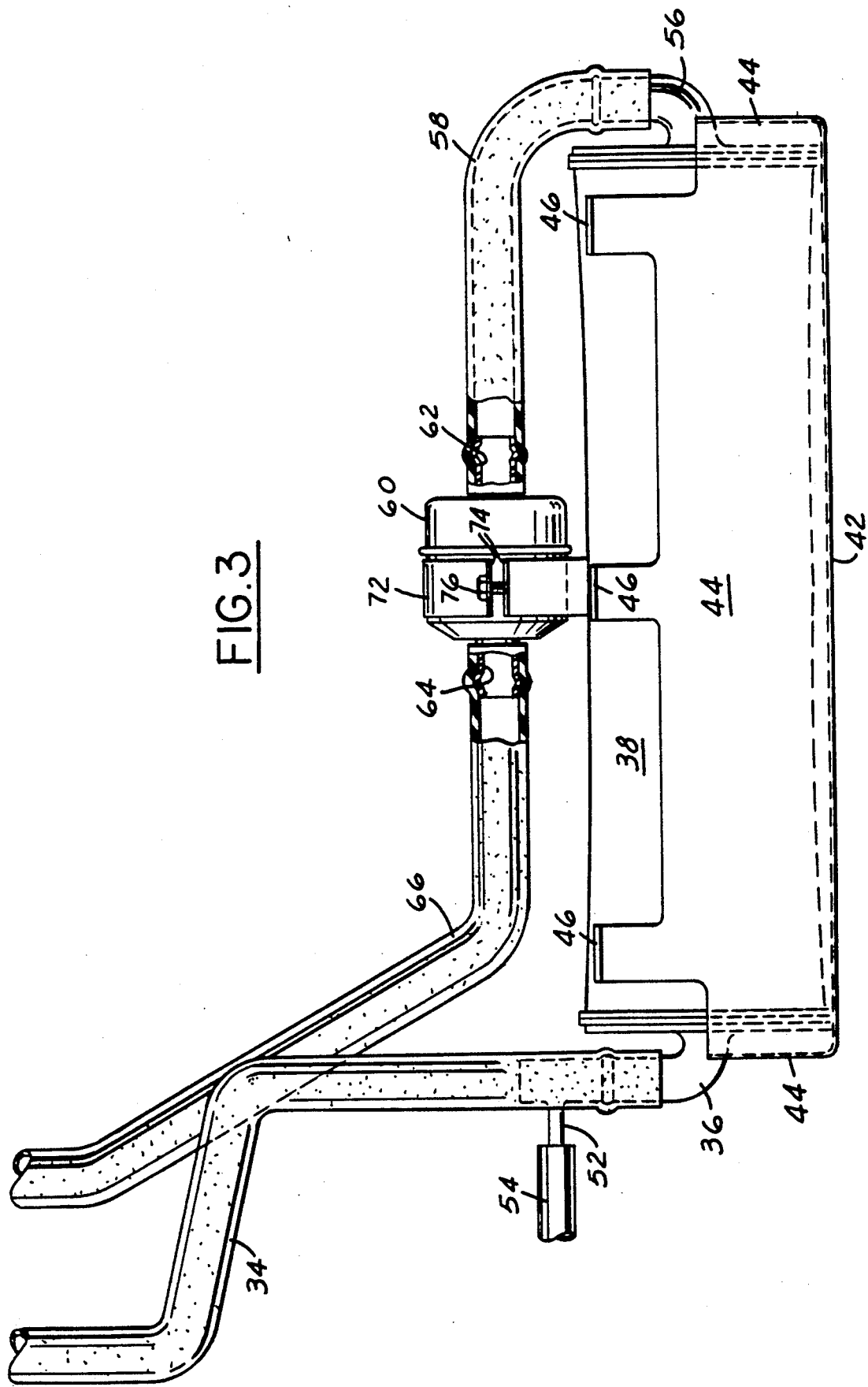

In FIGS. 1-3, a section of an automobile vehicle is partially illustrated. As shown in FIG. 1, the vehicle includes a side panel 10 and a portion of the fuel tank 12, both shown in phantom lines. The fuel tank is adapted to be filled with liquid fuel such as gasoline through a filler inlet device 14 and a connecting inlet hose 16. The device 14 is basically a tubular structure with an inlet end portion 18 supported by a wall 20 of an inlet cavity forming structure 22. Structure 22 has an edge 24 attached to the panel 10 which has an opening therethrough so that a fuel filler nozzle of a gas pump (not shown) can be inserted into the inlet 18 when fuel is to be added to the fuel tank. In FIG. 1, a removable cap 26 is shown away from the inlet end 18 of the device 14. Except during a filling operation, the cap 26 is threadably attached over the inlet opening 18. It should be noted that the opposite end 28 of the filler device 14 is connected to an upper end of the hose 16. As shown in FIG. 2 the lower end of the hose 16 is adapted to be connected to a tubular inlet 30 leading into the interior of the fuel tank 12.

The specific details of the filler inlet device 14 are unnecessary to understand the subject invention. The subject invention is specifically directed to an improved fuel vapor storage and purge system which is used to store fuel vapors displaced from the interior of the fuel tank during a filling operation and subsequently route the vapors to the vehicle engine for combustion. More complete details of the illustrated fuel vapor inlet device is found in the U.S. Pat. No. 4,966,299 entitled "Fuel Filler Assembly" by M. Teets et al. That application was filed on July 11, 1989 and like the subject application is assigned to the same assignee.

Basically, the fuel filler device 14 has a tubular structure that allows a pump nozzle (not shown) to introduce liquid fuel into the tank 12. As disclosed in the Teets application, a seal engages the nozzle to prevent discharge to atmosphere of air and fuel vapors through the inlet opening 18 during refilling. When an empty tank is refilled, a large volume of air and fuel vapor is displaced by the liquid fuel entering the tank from the pump nozzle. The displaced fuel vapor should not be discharged to the atmosphere. For this purpose, the filler device 14 includes a tubular outlet fitting 32 to receive the displaced vapor. A hose 34 attaches to the fitting 32 and extends to an inlet fitting 36 on one end of an elongated enclosure means or housing 38 which defines the fuel vapor storage canister. The housing or canister 38 temporarily stores fuel vapor until the vapor can be routed to the vehicle engine combustion chamber for burning. The above described vapor storage system is in principal basically the same type as used to store vapors from engine carburetors and the like in vehicles currently in service. The housing 38 contains a quantity of activated charcoal in a granulated state so that vapor may travel from the inlet end of the housing adjacent fitting 36 toward the opposite end.

The hollow housing 38 is preferably a plastic molded component. It is supported adjacent the filler device 14 by a tray-like member 40. Tray 40 has a bottom wall 42, sides 44 and a flanged means 46 formed along one side. The flange means 46 are attached to a structural wall 48 of the vehicle to support the tray as shown in FIG. 1. The bottom wall 42 has struck-out reinforcement means 50 formed therein to strengthen the tray.

During a filling operation, the fuel vapors are driven from the tank 12, through fitting 32, hose 34 and fitting 36 into the housing 38. There, the fuel vapors are absorbed by the activated charcoal and stored until the vapor can latter be burned in the vehicle engine's combustion chamber. The withdrawal of the stored vapors from the housing 38 is usually referred to as a purge operation. Thus, the vapors are purged from the charcoal storage until vapor storage is again needed during a subsequent refueling. Specifically, vapors are purged from the housing through the same fitting 36 that vapors enter the housing. As shown in FIG. 3, the fitting 36 also has an outlet fitting or nipple 52 attached to a hose 54. Hose 54 extends to a purge flow control means (not shown) which itself is connected to the engine's air/ fuel delivery means, such as an intake manifold. The flow control means is maintained closed during the tank refueling operation so that all displaced air and fuel vapors from the tank are directed into the housing 38. However, when the engine is running and the vehicle is in a cruise mode, the flow control is opened. This permits purging of vapors from the housing 38. This open condition allows a flow of air and fuel vapors to enter the outlet nipple 52 from the charcoal storage medium within the housing 38. This vapor is directed to the engine intake manifold as previously explained.

During the purge operation in which the outlet nipple 52 is receiving vapors from the housing 38, air is introduced into the housing 38 through a purge inlet fitting 56 as best shown in FIG. 3. Fitting 56 is attached to one end of a hose 58. The other end of the hose 58 is attached to a filter assembly 60. More specifically, filter assembly has an outlet fitting 62 which receives the other end of the hose 58. Filter assembly 60 prevents contaminants from being drawn into housing 38. Filter 60 also has an inlet fitting 64 which is attached to one end of a second hose 66. The other end of the hose 66 is attached to an outlet portion of a water separator device 68 best illustrated in FIGS. 1 and 2. Internal details of the water separator device 68 will be latter described but it is enough to say that it basically consists of a hollow housing with an air inlet and an air outlet fitting.

Referring back to the filter assembly discussed above, note that it is mounted atop the housing. Specifically, a raised boss 70 is formed on the molded housing 38. A band 72 nearly encircles the filter assembly 60 with ends 74 thereof extending radially outwardly therefrom. A fastener 76 extends through openings in the ends 74 and threads into the boss 70 to secure the filter 60 to the housing. Fastening or securing means other than the fastener 76 could be used for this purpose.

During the purging of the housing or canister 68, the water separator device 68 is necessary because ingestion of water into the canister 38 would be very undesirable. The contamination of the activated charcoal would greatly decrease the vapor storage capacity of the canister.

Details of the water separator device 68 itself are revealed in FIGS. 4-7. The device 68 is an enclosure formed by a hollow housing that is preferably formed of molded plastic material. An air outlet fitting 78 is provided and is adapted to be attached to hose 66. A plurality of air inlet openings 80 are formed in the device 68. Its interior 82 has an interior baffle wall 84 formed therein which directs air (and any water carried therewith) first upwardly and then downwardly. The air flow then impinges against an interior separator wall 86 which extends outwardly and upwardly from the wall of the enclosure. The separator wall 86 directs the air flow upwardly along one surface 88 and then reverses the air flow direction so that it passes downwardly along an opposite surface 90. Water carried by the air flow collects at the juncture of the enclosure wall and the separator wall, downwardly from surface 88. An elongated drain opening 92 is formed through the enclosure wall to allow the escape of water by gravity.

In FIGS. 8-10, a modified water separator device 94 is illustrated. Like the first embodiment detailed in FIGS. 5-7, a molded plastic hollow housing is shown which has an outlet fitting 96 formed thereon and a plurality of inlet openings 98. The interior 100 of the device 94 has a baffle wall 102 and a separator wall 104. Wall 104 has a first surface 106 over which air flows upwardly and away from the housing wall. Wall 104 also has a second surface 108 along which air flows downwardly. An elongated drain opening 110 allows collected water to escape by gravity action.

The modification in FIGS. 8-10 eliminates the need for a filter assembly 60 shown in FIGS. 1-3. The housing of device 94 defines a hollow filter compartment 112 located just upstream of the outlet fitting 96. An apertured wall 114 forms an inlet to the filter compartment 112 for air from the interior 100 of the water separator portion of the device. The compartment 112 contains filter material such as pieces of open cell type foam plastic material. Screen means 116 and 118 cover the inlet and outlet of compartment 112 to contain the filter material.

Although only first and second embodiments of the improved canister purge system and components are described and illustrated, it is obvious that there can be modifications to the system and structure which still fall within the scope of the invention as defined by the following claims.

What is claimed is as follows:

1. In a vehicle having an internal combustion engine and a fuel vapor storage system including a vapor storage canister which has an air permeable fuel vapor storage medium therein, a purge system for the canister, comprising: air inlet means to the interior of the canister for introducing a flow of air therein during a vapor purge mode of operation; fluid outlet means to the interior of the canister for discharging air and any fuel vapor released from the vapor storage medium during the vapor purge mode of operation; the air inlet means including a water separation device to prevent water from being carried into the canister with the air flow during the vapor purge mode of operation, the water separation device having a thin walled enclosure with an air inlet and air outlet, the enclosure configured to require the air flow therethrough to abruptly change direction and then pass generally upwardly over a surface of an upwardly inclined internal separator wall so that water carried by the air is collected on the internal wall of the enclosure and the inclined walls surface whereby the water is collected in the region of the juncture between the enclosure wall and the internal separator wall, the separator device having a drain opening means through the enclosure wall which is positioned in the juncture region; the device being oriented so that gravity causes the water to collect in the juncture region and to pass through the drain opening means out from the separator.

2. The separator device set forth in claim 1 in which the enclosure has an internal baffle wall extending upwardly adjacent the inlet to the interior and terminating short of the enclosure inner surface so that air flow is directed upwardly and about the baffle wall thus reversing the flow direction.

3. The separator device set forth in claim 2 in which the upwardly inclined internal wall generally extends obliquely from the wall of the enclosure and forms a trough-like juncture region whereby water is collected over the width of the enclosure.

4. The separator device set forth in claim 3 in which the drain opening means extends along the lower portion of the trough-like juncture region to effectively discharge the water collected in the trough.

5. In a vehicle having an internal combustion engine and a fuel vapor storage system including a vapor storage canister which has an air permeable fuel vapor storage medium therein, a purge system for discharging fuel vapors from the medium, comprising: the canister having an air inlet fitting for introducing air into the canister interior during a purge mode of operation; the canister having an air outlet fitting for discharging air and any fuel vapor released into the air from the medium during a purge mode of operation; a water separator device for supplying dry air to the canister's air inlet during a vapor purge mode of operation, the device having a thin walled enclosure with an air inlet and an air outlet; means connecting the air outlet of the device to the inlet fitting of the canister; the enclosure having an internal baffle wall extending upwardly adjacent the inlet and terminating short of the enclosure's upper inner surface so that air flow is directed from the outlet first upwardly along one surface of the baffle wall and then downwardly along an opposite surface of the baffle wall, thus reversing the flow direction; the device further having an internal separator wall which extends from the enclosure wall generally upward and outward therefrom at an oblique angle, the oblique separator wall being located downstream from the baffle wall so that the reversed air flow impinges on the separator wall and is directed upwardly and over a surface of the separator wall; the separator wall being joined to the enclosure wall to form a trough-like juncture region whereby water is collected over the width of the enclosure; an elongated drain opening extending along the lower portion of the trough-like region and through the enclosure wall so as to permit discharge of water collected in the trough by gravity action.

6. The separator device set forth in claim 5 in which the enclosure housing defines a compartment downstream from the separator wall and upstream from the fluid outlet; air permeable filter material in the compartment to prevent entry of contaminates into the canister during a purge mode of operation.

* * * * *